Nov. 20, 1934.     E. FREI     1,981,100
FOOT SUPPORT
Filed Aug. 30, 1932     5 Sheets-Sheet 1
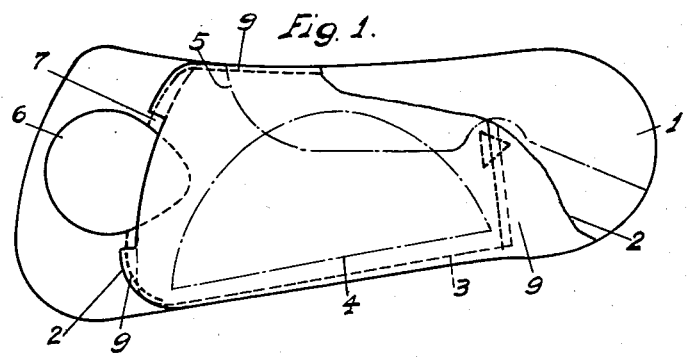
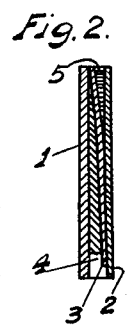
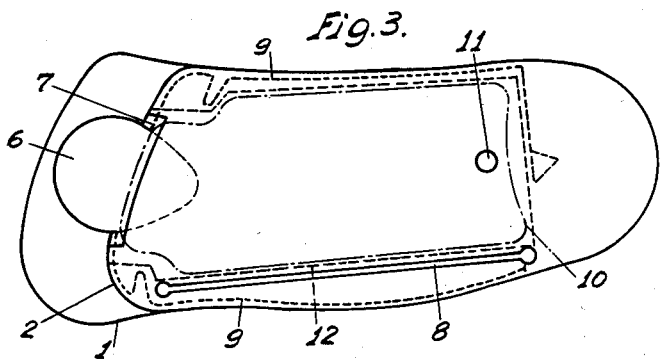
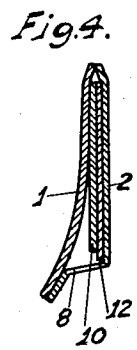
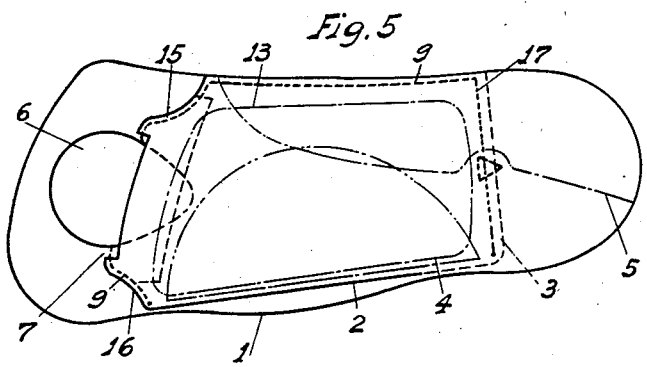
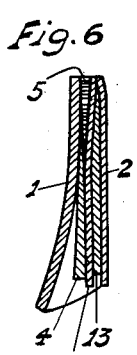
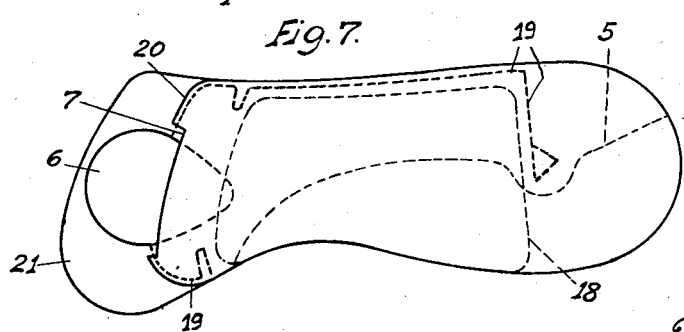
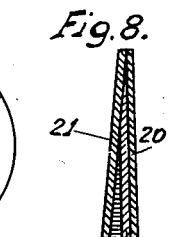
Inventor
Elizabeth Frei
By B. Singer, atty.

Nov. 20, 1934.  E. FREI  1,981,100
FOOT SUPPORT
Filed Aug. 30, 1932  5 Sheets-Sheet 2
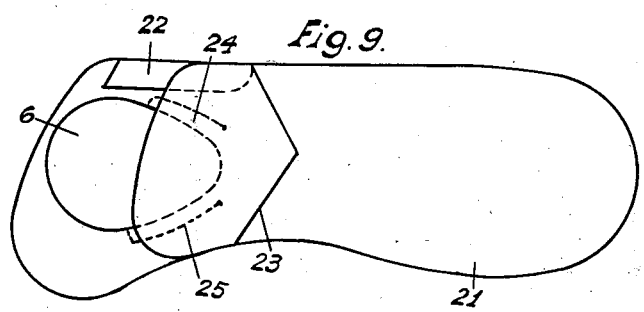 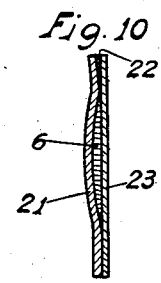
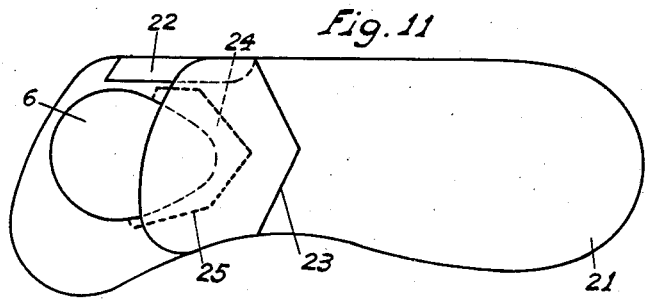 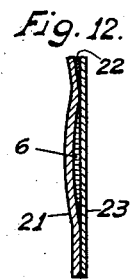
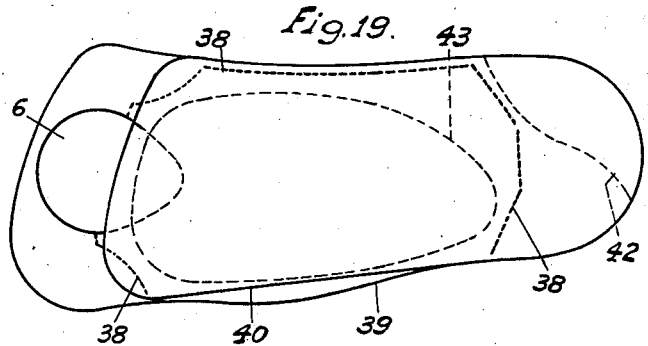 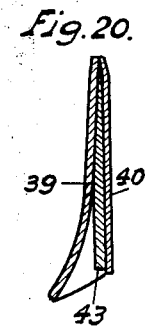
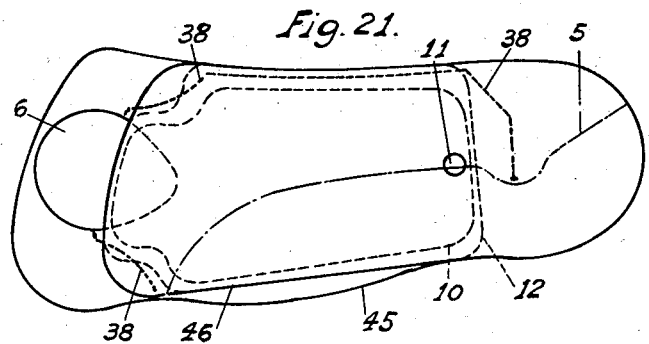 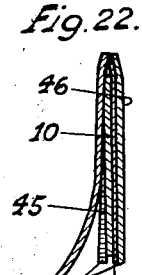

Nov. 20, 1934.   E. FREI   1,981,100
FOOT SUPPORT
Filed Aug. 30, 1932   5 Sheets-Sheet 3

Nov. 20, 1934.    E. FREI    1,981,100
FOOT SUPPORT
Filed Aug. 30, 1932    5 Sheets-Sheet 4
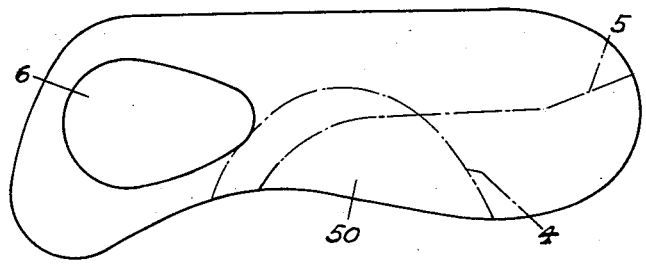
Fig. 23.
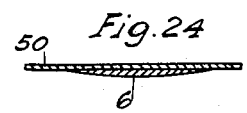
Fig. 24.
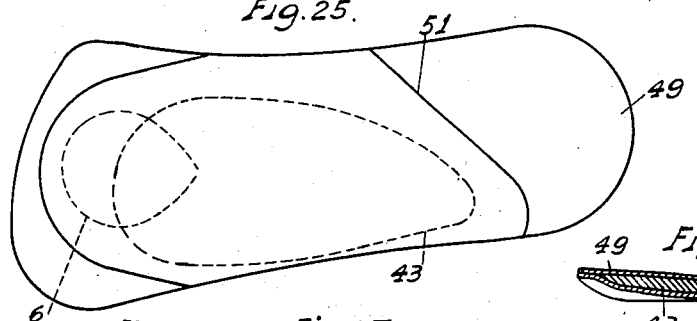
Fig. 25.
Fig. 26.
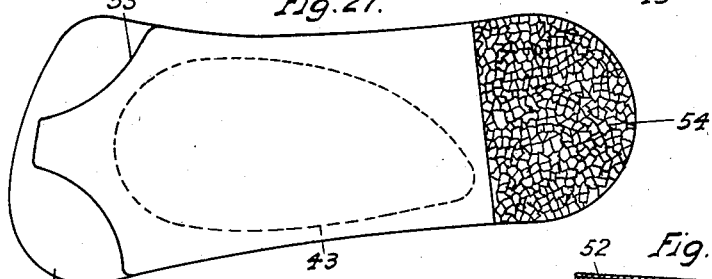
Fig. 27.
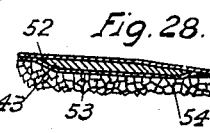
Fig. 28.
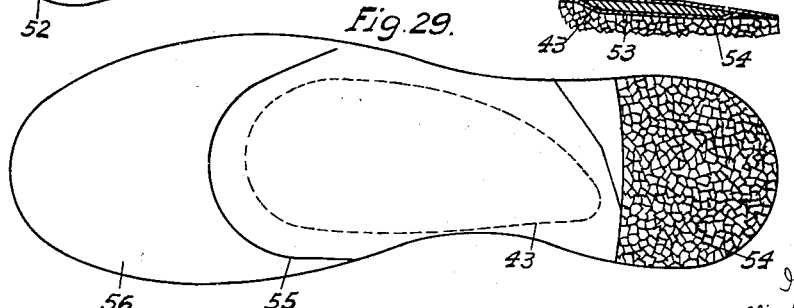
Fig. 29.
Fig. 30.
Inventor
Elisabeth Frei
By B. Linger
atty.

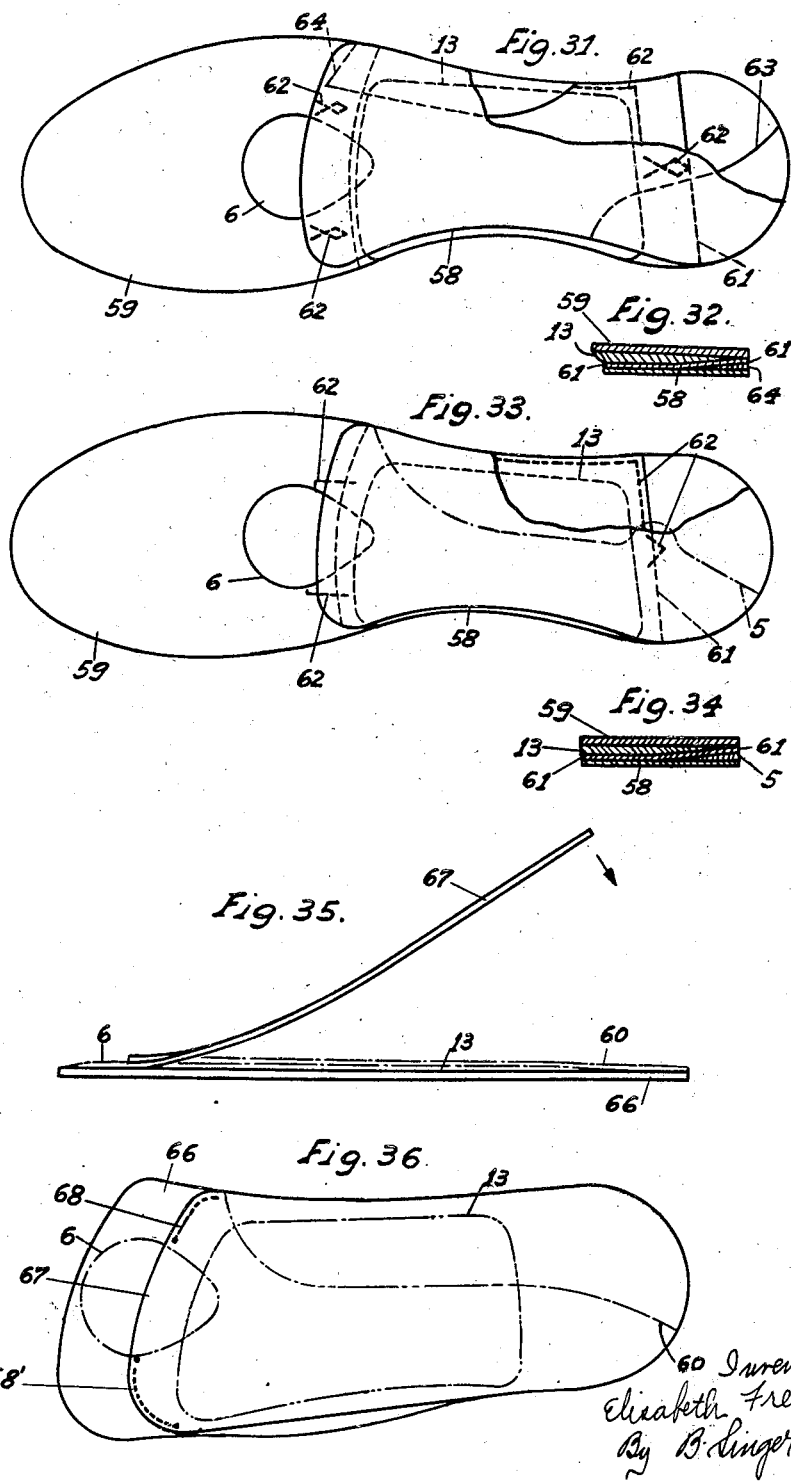

Patented Nov. 20, 1934

1,981,100

UNITED STATES PATENT OFFICE 1,981,100

FOOT SUPPORT

Elisabeth Frei, Zurich, Switzerland

Application August 30, 1932, Serial No. 631,083
In Switzerland September 2, 1931

4 Claims. (Cl. 36—71)

The object of the present invention is to provide improved appliances for the insertion in the shoe for the corrective treatment of abnormalities, distortions or weaknesses of the wearer's foot.

The invention is designed especially to make insoles and arch supports adapted to be used in shoes of the usual last-sizes, as to length and breadth and more especially to insoles for use in ladies' low shoes where very little space is available for such appliances for the corrective treatment of abnormalities or weaknesses of the wearer's foot or ankle.

It is known that the foot rests principally on three points and in a new shoe the foot of the wearer has to work itself a good bedding in the shoe by forming the sole etc. a process known as "breaking in" a new shoe.

The main object of my invention is to provide an appliance to be placed in ordinary commercial shoes to give not only a snug fit but to allow for necessary adjustment of the foot while using but little of the space available in the shoe for the wearer's foot.

A further object of my invention it to provide additional space within the shoes for the three points of support by placing the supporting faces very low within the shoe for instance by working cavities in said sole.

A still further object consists in the provision of means to give each or all of the three points on which the foot rests either a resilient bearing or a cushioned support, or to extend the space within the shoe for the said supporting.

I attain these and other objects as described hereinafter by the provision of composite insoles or arch supports having the lining shaped and outlined in such a manner that at the three supporting points there is no lining whatever.

A further object of my invention is to provide a device which is simple, efficacious and comfortable in use.

Other objects and features of the invention will appear more fully from the accompanying description and drawings and will be pointed out in the annexed claims.

In the drawings

Figs. 1 to 34 illustrate seventeen different insoles embodying my invention each insole being shown in a bottom plan view and in a cross section;

Fig. 35 is a side elevation of a further embodiment of my invention showing the building up of a support;

Fig. 36 is a plan view thereof;

Figure 13:
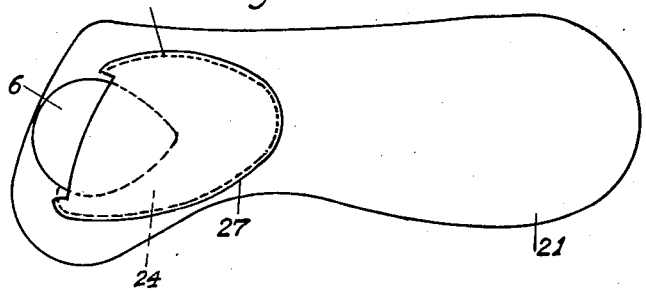
Figure 14:
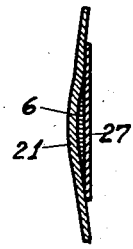

Referring particularly to Figs. 1 and 2 of the accompanying drawings the body of the insole is shaped to properly fit on the sole and heel of a shoe and extend under the foot at the heel and the instep and which if desired extends to the toes of the foot. The insole comprises an upper layer 1 of thin, stiff leather or similar material and a lower layer or lining 2 of soft leather soft fabric or the like. Intermediate the layers 1, 2 a third layer 3 is arranged, the layers 1 to 3 are interconnected by stitches 9. The lining 2 and the layer 3 are shorter as the upper layer 1 and the stitching at the fore end of the lining has a break at 7 to allow the insertion of a pad 6 to correct the position of the metatarsals uniting the parts 1 and 3 on the one hand and the parts 3 and 2 form pockets, one on each side, which pockets are marginally open. In said pockets, pads or inserts 4, 5 are placed. That part of the insole projecting beneath the metatarsal-bones is held comparatively very thin, it takes up but little space and the parts of the upper layer 1 at both sides of the pad 6 may be cut away to give place for the great toe and the small toe. The stitching 7 and the pockets are formed in such a manner that an insert 4 may be inserted to support the arch of the foot, and a further insert 5 which extends from the heel to the metatarsals. The heel portion may be formed with a depression to form a bed for the heel, this depression may be provided on all the examples described in the following specification.

The insole shown in Figs. 3 and 4 differs in that the stitching 9 unites the lining 2 with the upper layer 1 all around, leaving free but a small opening 7 at the fore end to insert the pad 6. A pocket is formed at the heel to allow the insertion of wedge-like supporting members. Between the lining 2 and the upper layer a metallic base plate 12 is fixed by a rivet 11. A slot 8 is provided in the lining 2 for the insertion and removal of supporting members 10. The thickness of the insole is reduced; the front end corner portions may be cut-away to provide increased space for the toes.

Figs. 5 and 6 show a further embodiment of my invention. The upper layer 1 of thin, flexible leather is united with a lining 2 of soft leather, fabric etc. and with an intermediate layer 3 by stitching 9. Pockets are formed thereby and in said pockets inserts 4, 5 and 13 are removably arranged. The insert 13 may consist of metal and the insert 5 extends up to the heel. The inserts 4, 5, 13 and the pad 6 overlap each other and give the foot a good support. The edges of the lining parts 2, 3 are cut away at 15 and 16 to make room for the toes. The lining 2 and the intermediate layer 3 may be cut away at the heel behind the stitching 17.

A slightly modified construction is shown in Figs. 7 and 8. The upper layer 21 and the lining 20 are united by the stitching 19. By the stitching 19 an open pocket is formed in which the inserts 5, 18 are placed. The insole shown corresponds in most other respects with above described examples.

The insoles shown in Figs. 9 to 14 comprise each a piece of thin and stiff leather 21 to which a lining 23 or 27 of soft leather is attached by stitching 24, 25. A pocket 24 is formed by said stitchings adapted to receive the pad 6 to support metatarsal bones. The lining covers but a small part of the insole, the latter therefore is comparatively thin. To the lining and to the back of the upper layer a wedge-shaped supporting member 22 is fixed by adhesives.

Figure 15:
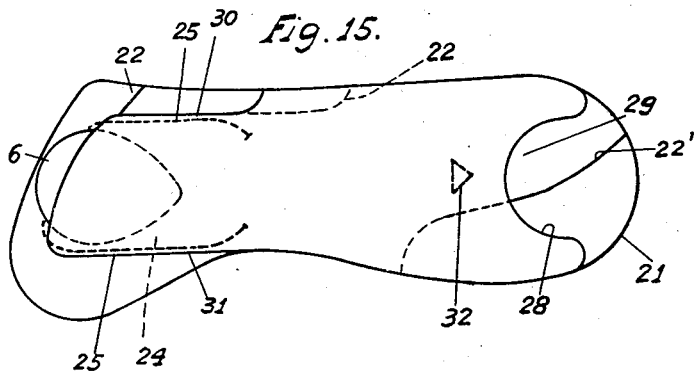
Figure 16:
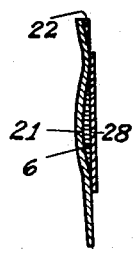
Figure 17:
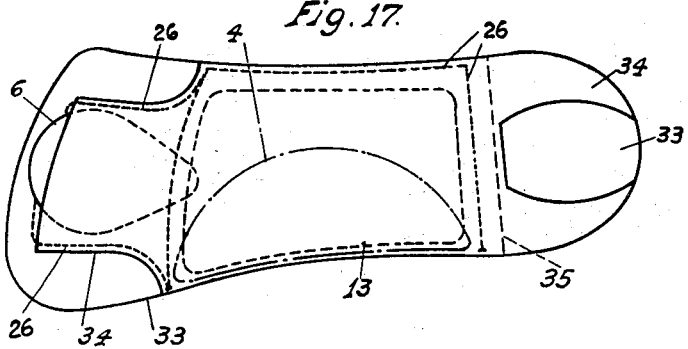
Figure 18:
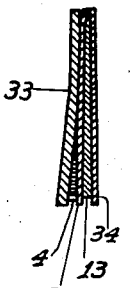

The insole shown in Figs. 15 and 16 differs mainly in that from the example shown in Figs. 9 and 10, that the lining 28 covers nearly the whole of the back of the upper layer except the heel portion 29 and small marginal portions 30, 31 at the fore end. The lining 28 is held by stitchings 25, 32. Supporting members may be inserted between lining and upper layer at any place. The stitchings 25 and 32 are spaced from the margins of the back or upper layer and the lining is thereby adapted to be cut away and removed at the required places to accommodate the first and fifth metatarsal heads. The stitching 32 is spaced from the heel of the upper layer or back and also midway between the side margins thereof and the lining is cut away at 29 to form a space for the reception of the heel. A further example is shown in Figs. 17 and 18. An upper layer 33 of thin flexible leather, a lining 34 of soft leather and an intermediate layer 35 of soft leather or fabric are united by stitching 26. Pockets are formed thereby for wedge shaped inserts 4, 13 and of the metatarsal pad 6. The insert 13 may consist of a metallic base plate. The layer 35 ends at the heel and a part 33 of the lining 34 is cut out to provide extra room for the heel. In this form of the invention also the stitchings 26 are spaced from the margin of the upper layer or back to permit the cutting away of the lining for the reception of the metatarsal heads and the heel, as will be understood.

The insole according to the present invention may be constructed as shown in Figs. 19 and 20. The upper layer 39 of leather is curved upwardly along its one longitudinal edge. A lining 40 is affixed thereto by stitching 38. Two marginal openings are provided to form pockets one for the pad 6 and the other for the insert 43. At the heel the lining 40 is loose and inserts 42 may be placed between and held by the parts 39, 40.

As shown in Figs. 21 and 22 a metallic base plate 10 may be fixed by a rivet 11 between the upper layer 45 and the lining 46 the said parts 45, 46 being united by stitching 38. The stitching 38 ends near the heel at the middle of the sole whereby the insertion of a supporting member 5 extending from the heel to the metatarsals is made possible. An extra lining 12 of fabric etc. is placed under the metal plate 10 to prevent excessive wear of the lining 46.

In the Figs. 23 to 30 examples are shown in which the supporting members for the sick foot are affixed to a properly shaped piece of leather 49, 50, 52, 56 by means of adhesives.

In the construction shown in Figs. 23 and 24 the pad 6 and two supporting members 4, 5 are affixed at the back of the insole 50.

In the insole shown in Figs. 25, 26 the pad 6 and the member 43 are held in place by a lining 51 affixed to the sole 49 by adhesive.

Figs. 27 and 28 show a device in which a supporting member 43 is held in place by a lining 53, which extends from the heel to near the metatarsal portion. Parts of the sole 52 projecting over the edge of the lining 53 may be cut away to give additional space for the great toe and the small toe. The heel is formed by a piece 54 of porous rubber which is attached to the sole by adhesive.

Figs. 29 and 30 show a full length insole 56 which otherwise corresponds in every respect with that shown in Figs. 27 and 28. The lining 55 extends up to the metatarsals.

Full length insoles are shown in the Figs. 31 to 34. To the upper layer 59 of thin leather, a lining 58 and an intermediate layer 61 are attached by stitching 62. The parts 58, 61 extend near the metatarsals. Pockets are formed to receive the pad 6 and inserts 5, 13, 63, 64. The two examples illustrate how inserts may be shaped and arranged to adapt the device for the correction of any foot.

Figs. 35 and 36 illustrate how a device for correcting a deformed foot may be quickly built up. To a sole 66 of leather, a lining 67 is attached by the stitching 68, 68'. A pad 6 for supporting the metatarsals is inserted in the gap between said stitchings 68, 68'. The supporting members 13, 60 are placed on the sole and are fixed in their proper position by the lining 67 which is pressed on the sole 66 and attached thereto by adhesives retaining all the pieces in their position.

All the different devices are especially useful for ladies' shoes. It is well known that such shoes are usually made to leave little or no room for any insoles. On the other hand arch supports and so on cannot be dispensed with. According to the invention the object desired is attained by making the foot supports with no or with but little lining and the use of such lining is especially obviated at the fore end of the foot where there is no space available at all for any support. A further feature of the invention consists in that the pockets to receive the insets are made in the lining and in such a manner that parts of the insole not necessary for supporting the foot either at the fore end or at the heel may be cut-off to enlarge the space available in the shoe for the foot.

Figure 37:
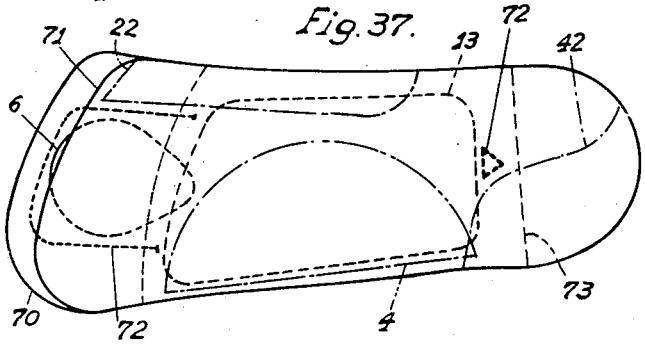
Figs. 37 and 38 show a plan view and in cross-section a further example.
Figure 38:
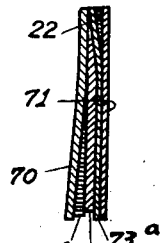

In the example shown in Figs. 37 and 38 a lining 71 is united with the upper layer 70 by a line of stitching 72 near the fore end and by a triangular stitching near the heel. Pockets are formed open at the marginal line in which pockets inserts 22, 42 and a pad 6 may be placed. The inserts 22, 42 may be attached to the lining 71 by adhesives. By two lines of stitching 73 a second layer 73$^a$ is fixed to the upper layer 70 forming a pocket to receive the inserts 4 and 13 of leather or other material.

What I wish to secure by U. S. Letters Patent is:

1. An arch-supporting inner sole comprising a layer, a sole width lining on the under side of and shorter than said layer and the front end of which is spaced from that of the layer so that said lining occupies but a minimum of space, said layer and lining being so connected together at points spaced from the margin of the layer and the toe and heel thereof as to form a pocket therebetween, and a supporting member arranged in said pocket, said lining being cut away and removed at points between the connected portions of the lining and layer and the margin of the layer to accommodate the first and fifth metatarsal heads and the heel.

2. An inner sole as claimed in claim 1, in which the pocket is open at one lateral side for the reception of the supporting member and the central portion of the lining is disconnected from the layer to form a pocket therebetween at the front end of the lining, and including a pad removably arranged in said last named pocket.

3. A foot support according to claim 1, in which the lining is extended to the heel part and is cut away centrally thereat so as to leave two flaps, one on each side of the heel part.

4. A foot support according to claim 1, in which the connected portions of the layer and lining at points spaced from the margin of the layer are secured together by stitching.

ELISABETH FREI.